United States Patent [19]
Kolb et al.

[11] Patent Number: 5,101,415
[45] Date of Patent: Mar. 31, 1992

[54] LASER RESONATOR MIRROR WITH WAVELENGTH SELECTIVE COATINGS ON TWO SURFACES

[75] Inventors: William P. Kolb, Redwood City; Benjamin H. Cook, Jr., Livermore, both of Calif.

[73] Assignee: Coherent, Inc., Palo Alto, Calif.

[21] Appl. No.: 582,765

[22] Filed: Sep. 14, 1990

[51] Int. Cl.$^5$ .............................................. H01S 3/08
[52] U.S. Cl. ...................................... 372/99; 372/23; 372/92; 372/108; 372/95
[58] Field of Search ................... 372/95, 92, 89, 23

[56]  References Cited
  U.S. PATENT DOCUMENTS

| | | | |
|---|---|---|---|
| 3,688,218 | 8/1972 | Gleason | 372/19 |
| 4,615,033 | 9/1986 | Nakano et al. | 372/99 |
| 4,615,034 | 9/1986 | von Gunten et al. | 372/99 |
| 4,757,507 | 7/1988 | Wondrazek et al. | 372/19 |
| 4,903,271 | 2/1990 | Yasui et al. | 372/99 |
| 4,951,285 | 8/1990 | Cole et al. | 372/99 |

FOREIGN PATENT DOCUMENTS 2091439  1/1681  United Kingdom .

OTHER PUBLICATIONS

Bethea; "Megawatt Power at 1.318 $\mu$ in Nd$^3$ +: YAG and Simultaneous Oscillation at Both 1.06 and 1.318 $\mu$"; *IEEE Jour. Quant. Elect.*, Feb. 1973.

*Primary Examiner*—Leon Scott, Jr.
*Attorney, Agent, or Firm*—Limbach, Limbach & Sutton

[57]   ABSTRACT

An improved laser mirror (22) is disclosed with wavelength selective coatings on the inner and outer surfaces (32) and (34) thereof. The coating on the inner surface (32) is reflective of light in a first wavelength region (36) and transmissive of light in a second wavelength region (38). The outer surface (34) is reflective of light in the second wavelength region (38). In the preferred embodiment, one of the surfaces of the mirror is planar and the other is curved to facilitate alignment. The different curvatures of the inner and outer surfaces allows the diameter of the beam of the two wavelength regions to be independently controlled allowing optimization of the mode generated by the laser (20).

16 Claims, 5 Drawing Sheets

LASER RESONATOR MIRROR WITH WAVELENGTH SELECTIVE COATINGS ON TWO SURFACES

TECHNICAL FIELD

The subject invention relates to optimizing the performance of lasers which generate light at more than one wavelength.

BACKGROUND OF THE INVENTION

A basic laser includes a gain medium located between a pair of mirrors which define the laser resonator. One of the mirrors is a called the high reflector and reflects substantially all of the laser light. The other mirror is called the output coupler and is partially transmissive to the laser light.

The curvature of the resonator mirrors plays an important part in optimizing the performance of a laser. For example, the shape of the resonator mirrors effects the diameter and the mode of the laser beam. Typically, the mode of the laser beam is also partially controlled by inserting a mode control aperture within the resonant cavity. By properly adjusting the diameter of the laser beam in the cavity with respect to the aperture, a laser beam having single transverse mode or $TEM_{00}$ mode characteristics can be generated.

FIG. 1a illustrates a plate 10 of the type which can be inserted into the cavity of a laser to control the mode of the beam. Plate 10 includes a mode control aperture 12. FIG. 1b illustrates a transverse mode profile 14 of a laser beam which could propagate in a laser without an aperture. Profile 14 corresponds to multiple transverse modes since it has a center section 16 of high intensity and two symmetric outer transverse lobes 18. A laser can be forced into single transverse or $TEM_{00}$ mode operation if the size of the aperture is such that the outer transverse modes 18 experience high diffraction losses.

In order to optimize performance, the diameter D of the aperture 12 should be small enough so that the outer transverse modes of the beam experience enough diffraction losses such that they become extinguished. On the other hand, the diameter of the aperture 12 should be large enough so that the losses experienced by the $TEM_{00}$ mode will be minimized thereby maximizing output power. The desired optimization can be achieved either by changing the size of the aperture or by changing the beam diameter. The diameter of the beam is controlled by the curvature of the resonator mirrors and their spacing.

Optimizing the relationship between the size of the mode control aperture 12 and the diameter of the beam is fairly straightforward when the laser is operating at a single wavelength or multiple wavelengths in a single narrow region. The problem becomes more difficult when the laser operates at multiple wavelengths which are not close together. The added complexity is due to the fact that the diameter of a beam is proportional to the square root of its wavelength. Thus, for a given resonator design having mirrors of a specific curvature, the diameter of the beam at the mode control aperture will be different for different wavelengths. Accordingly, it is not possible to optimize the mode control aperture for two disparate wavelengths beams.

In the past, various compromise solutions have been implemented to address the problem. For example, the diameter of the aperture can be selected to be an average between the ideal diameters for the different wavelength regions. Alternatively, the diameter of the aperture could be selected to optimize the mode control for one wavelength region while allowing the mode of the other wavelength region to suffer.

It would be desirable to provide a means for optimizing the mode performance of a laser which generates light in more than one wavelength region. In accordance with the subject invention, this means includes providing different wavelength selective coatings on the inner and outer surfaces of a single resonator mirror.

For many years, mirror coatings have been available which are designed to optimally reflect light in certain wavelength regions. For example, coatings have been developed to reflect either visible radiation or ultraviolet radiation. These type of coatings are often called cut-off coatings as they reflect all light either above or below a certain cut-off wavelength.

More recently there have been developed specialized coatings which are designed to reflect light at a single wavelength or in a very narrow wavelength region. These coatings are used on resonator mirrors to select wavelengths from lasers having gain mediums with multiple lasing transitions. As noted above, a single gain medium may be capable of lasing at multiple wavelengths. Each of these wavelengths has a different gain and potential power. The laser can be conditioned to laser at the selected wavelength by designing a coating which is reflective at the desired wavelength and transmissive at other wavelengths. By this arrangement, the nonselected wavelengths will have extremely high losses and will not laser and therefore the selected wavelength will be favored.

Information on selective coatings for mirrors can be found in the following documents, the disclosures of which are incorporated by reference. UK Patent Application GB 2,091,439, published July 28 1982, discloses a wavelength selective mirror for a $CO_2$ laser. U.S. Pat. Nos. 4,615,033 and 4,615,034 both disclose coatings which allow the oscillation of the 488 nm line in an argon ion laser. All of the latter references disclose the application of the Wavelength selective coating on a single surface of a resonator mirror.

Accordingly, it is an object of the subject invention to provide a resonator mirror with wavelength selective coatings formed on both sides thereof.

It is another object of the subject invention to provide a resonator mirror with wavelength selective coatings formed on both sides thereof and wherein the curvature of the sides is different.

It is still a further object of the subject invention to provide a resonator mirror with wavelength selective coatings formed on both sides thereof and wherein one side is planar and the other side is curved.

It is still another object of the subject invention to optimize the performance of a multiwavelength laser.

It is still a further object of the subject invention to optimize the mode performance of a multiwavelength laser.

It is still another object of the subject invention to optimize the mode performance of a multiwavelength laser using a resonator mirror having wavelength selective coatings on the inner and outer surfaces thereof.

It is still a further object of the subject invention to provide a method of optimizing the mode performance of the laser by adjusting the angle and position of a resonator mirror having wavelength selective coatings on the inner and outer surfaces thereof and wherein one of the surfaces is planar and the other is curved.

SUMMARY OF THE INVENTION

In accordance with the subject invention, a laser resonator mirror is provided with wavelength selective coatings on the inner and outer surfaces thereof. More particularly, the inner surface is provided with a coating which is reflective of radiation at a first wavelength region. The outer surface is provided with a coating which is reflective at a second wavelength region. The coating on the inner surface must be transmissive to the second wavelength region so the light will pass through the coating and be reflected by the coating on the outer surface of the mirror.

In the preferred embodiment, the curvature of the inner and outer surfaces of the mirror is different. In this way, the diameter of the beam at each of the two wavelengths can be individually controlled. This freedom allows the laser designer to select the desired diameter of the beam at the mode control aperture for both wavelengths. Accordingly, mode performance can be optimized simultaneously for both wavelengths.

Theoretically, a laser mirror can be designed with specific curvatures on both the inner and outer surfaces thereof. Unfortunately, mass production manufacturing makes it quite difficult to accurately control the alignment between the two surfaces. During the manufacturing process some degree of wedging is introduced preventing the mirror from being optimally aligned.

Therefore, in the preferred embodiment of the subject invention, one of the mirror surfaces is curved while the other surface is planar. By this arrangement, the mirror can be more readily aligned. Alignment of the beam reflected from the curved surface is achieved by translating the mirror in a plane parallel to the planar surface. Alignment of the beam reflected from the planar surface is achieved by the tilting the mirror with respect to the longitudinal axis of the laser.

In the illustrated embodiment, the coatings utilized are reflective of relatively narrow wavelength ranges and are used optimize the mode performance of the laser. A resonator mirror with reflective coatings on both surfaces can have broader applications. For example, it is difficult to manufacture a single coating which is optimally reflective over a very broad range. Thus, a single ideal coating design is not available for lasers which generate both visible and ultraviolet radiation. Typically, the customer will select a mirror coating to enhance performance in the region of interest.

As can be appreciated, the extra degree of freedom afforded by the subject mirror design allows a single resonator mirror to be optimized over a much broader range. For example, the inner surface of the mirror can be reflective over a broad UV range. The coating on the outer surface of the mirror can then be optimized for reflection over a broad visible range. In this manner, the coating designer can optimize each coating to improve performance in both wavelength regions simultaneously. This approach could be very useful in ion lasers which use a combination of argon and krypton gases and laser over a broad wavelength region.

Further objects and advantages of the subject invention will become apparent from the following detailed description, taken in conjunction with the drawings, in which:

DETAILED DESCRIPTION OF THE PREFERRED EMBODIMENT

Figure 1A:
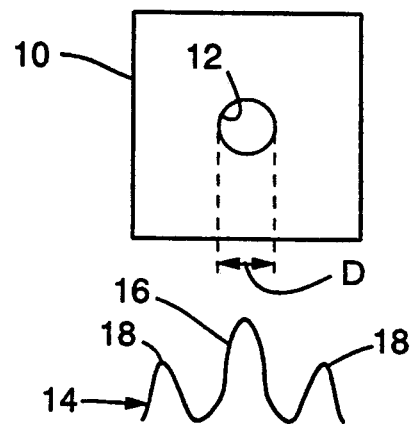
FIGS. 1a and 1b are diagrams illustrating the function of a mode control aperture in a laser.
Figure 1B:
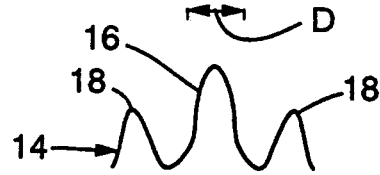
Figure 2:
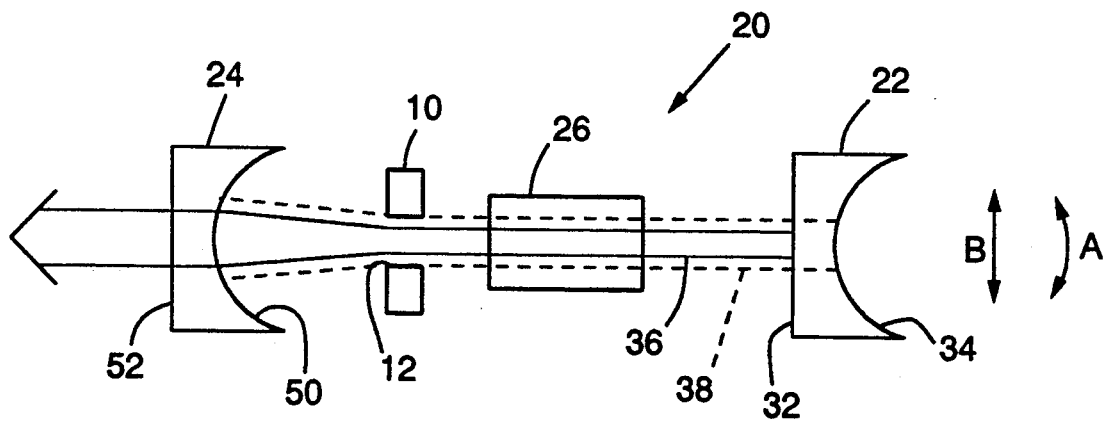
FIG. 2 is a diagram of a laser resonator utilizing a resonator mirror having wavelength selective coating on the inner and outer surfaces thereof in accordance with the subject invention.

Referring to FIG. 2, there is illustrated a laser 20 having a resonator mirror 22 formed in accordance with the subject invention. Laser 20 includes a resonant cavity defined by a pair of mirrors 22 and 24. Mirror 24 is an output coupler and is partially transmissive to the lasing wavelengths.

Laser 20 further includes a gain medium 26 which is excited by a suitable source. Gain medium 26 is of the type that has multiple lasing transitions and can generate laser light at more than one wavelength.

In the illustrated embodiment, laser 20 is further provided with a plate 10 having a mode control aperture 12. As noted above, the diameter of aperture 12 must be adjusted with respect to he diameter of the laser beam in order to optimize mode performance.

In accordance with the subject invention, mirror 22 is provided with reflective coatings on both the inner and outer surfaces 32 and 34 thereof. Inner surface 32 is provided with a coating which is reflective with respect to at least one of the wavelengths or wavelength regions generated by gain medium 26. The beam of light of this reflected wavelength region is shown in solid line at 36. The coating on inner surface 32 is transmissive to at least one other wavelength or wavelength region which is generated by the gain medium. The beam of light corresponding to this different wavelength region is illustrated by dashed line 38. In accordance with the subject invention, the outer surface 34 of mirror 22 is provided with a coating which is reflective of the second wavelength region.

It should be noted that the coating on the outer surface need not be as wavelength specific as the coating on the inner surface. For example, the coating could reflect both wavelength regions. Since the inner surface will reflect the light in the first region, the level of reflectivity of the coating on the outer surface with respect to the first wavelength region is irrelevant. The reflectivity characteristics of the coating of the outer surface must include high reflectivity to the radiation in the second wavelength region.

One advantage having a resonator mirror with wavelength selective coatings on two surfaces is that the mode performance of the laser can be optimized. As noted above, the diameter of the beam is proportional to the square root of its wavelength. Thus, in order to properly match both wavelengths to the diameter of the aperture 12, different intercavity beam profiles must be used. The beam profile for each of the wavelengths can be separately designed by independently setting the curvatures of the inner and outer surfaces of the mirror 22.

In designing the resonator structure, both surfaces of mirror 22 can be provided with non-planar curvatures. However, it has been found that alignment of such a mirror can be difficult due to manufacturing inaccuracies. More specifically, alignment of a curved mirror is typically achieved by translating the mirror. If this approach were taken, alignment of the second curved surface would depend entirely on the accuracy of the alignment between the front and back surfaces. In practice, it is difficult to manufacture optics where the front and back surfaces are spaced exactly the same amount over the entire optic and some wedging will be observed. If mirror 22 has two curved surfaces, any wedge effect greater than about one second of arc would make optimal alignment very difficult and result in cavity losses at one or both wavelengths.

Centration, or centering of the front and rear surface radii of curvatures of the mirror is also a difficult manufacturing exercise. For this application, centration errors produce the same effects as the wedge errors discussed above.

In order to overcome both wedging and centration errors, in the preferred embodiment of the subject invention, one of the surfaces of mirror 22 is provided with a planar configuration. In this manner, the alignment of the two surfaces can be separated into two separate motions. More specifically, tilting the mirror (about an axis shown by arrows A) will affect the alignment of the beam 36 reflecting off the planar surface 32. The mirror is tilted until the planar surface 32 is perpendicular to the optical axis of the laser.

The alignment of the beam 38 reflecting off the curved surface 34 is then adjusted by translating the mirror 22 in a plane parallel to the planar surface 32 as illustrated by arrows B. Translation of the mirror will not effect the alignment of the beam 36 reflecting off the planar surface 32. Optimal alignment is achieved when a line tangent to the curved surface 34, at a point coincident with the beam, is perpendicular to the optical axis of the laser. By using this approach, optimal alignment of the beam in both wavelength regions can be independently achieved.

The subject invention has been implemented in an argon ion laser of the type described in U.S. Pat. No. 4,736,379, issued Apr. 5, 1988 and incorporated herein by reference. In this implementation, the coating on the planar inner surface 32 has been optimized for reflecting wavelengths in the ultraviolet region and therefore the 351 nm and 364 nm argon ion UV laser transitions. The coating is also substantially transmissive to the visible portion of the argon laser transition spectrum.

The coating on the outer surface 34 is designed to be reflective in the visible region and particularly to the 488 nm transition in argon. The placement of the UV reflective coating on the inner surface 32 helps to maximize the output power for those weaker lines. The visible light which is reflected from the outer surface 34 experiences higher losses due to the coating on the inner surface and bulk losses from the substrate. Since the visible radiation has a power level much greater than the UV radiation, these added losses can be better tolerated.

Figure 3:
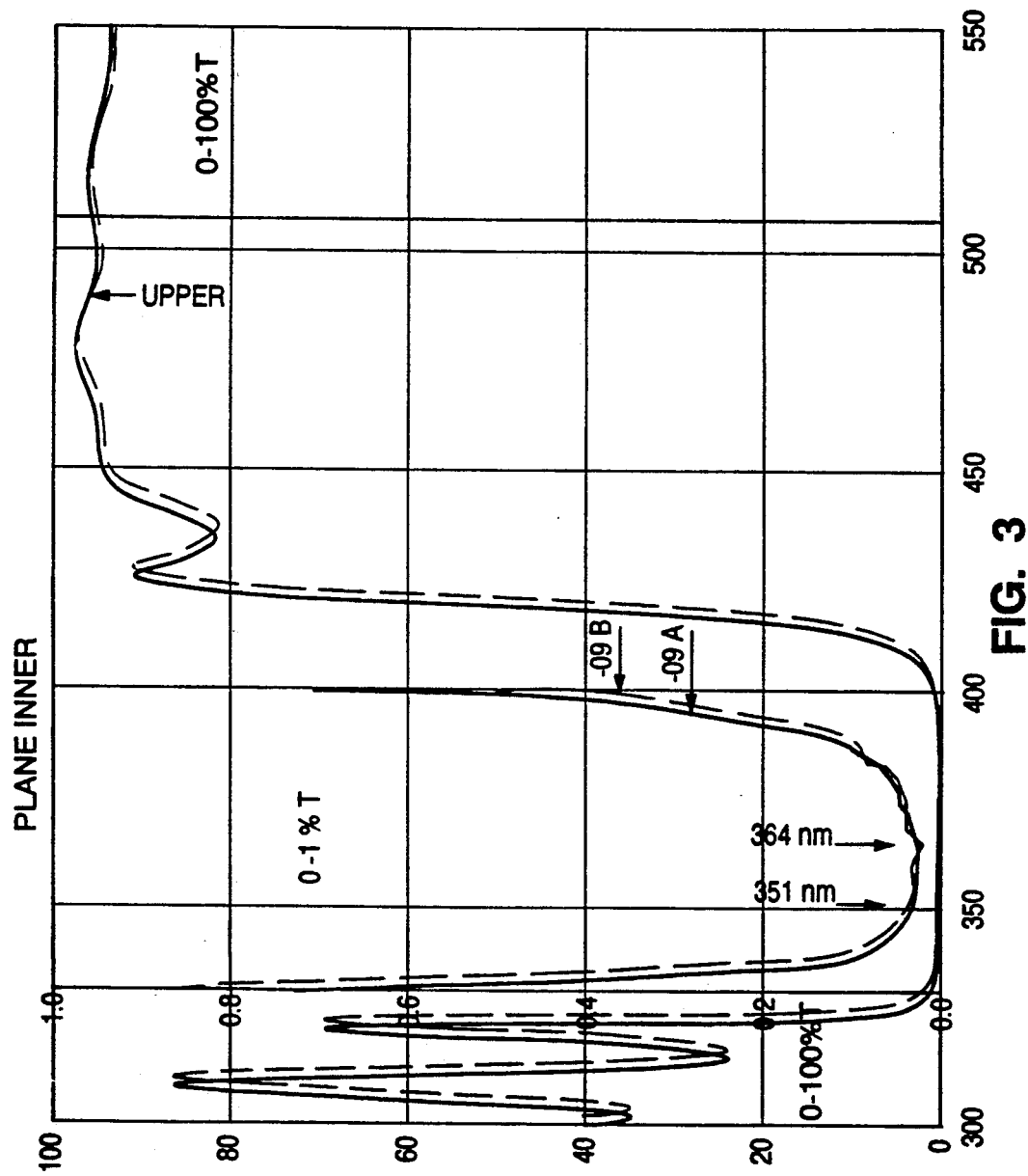
FIG. 3 is a graph plotting the level of transmission with respect to wavelength of the inner surface a resonator mirror formed in accordance with the subject invention.
Figure 4:
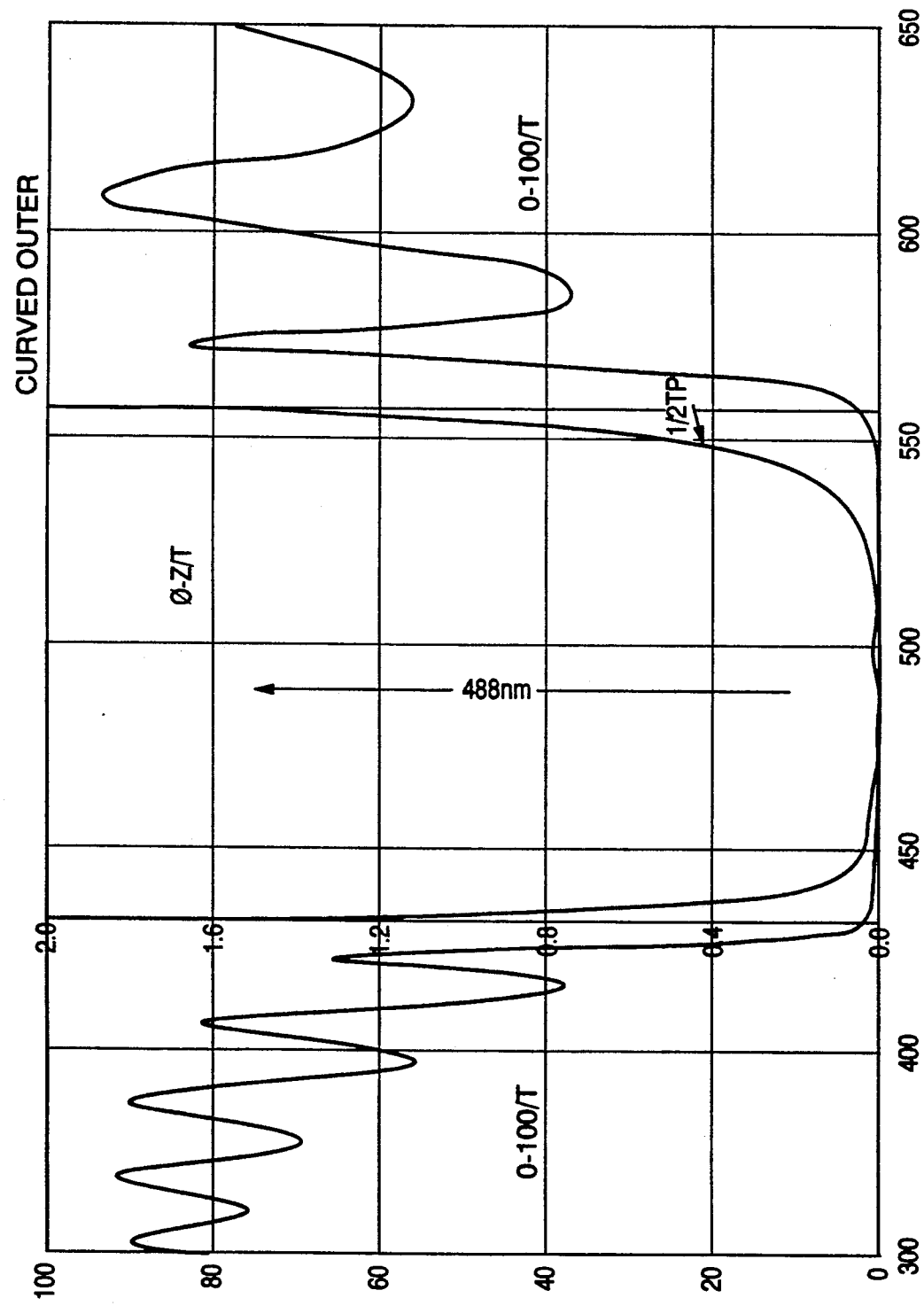
FIG. 4 is a graph plotting the level of transmission with respect to wavelength of the outer surface a resonator mirror formed in accordance with the subject invention.

FIG. 3 is a graph which plots the transmission characteristics of the inner surface 32 of the mirror. As can be seen, the transmission in the UV band (covering the 352 and 364 nm lines) is very low and therefor reflectivity is very high. In contrast, the transmission of the visible wavelengths is roughly 90 percent. Thus, the visible wavelengths will be substantially transmitted through the inner surface and reach the outer surface 34. FIG. 4 is a graph which plots the transmission characteristics of the outer surface of the mirror. As can be seen, the transmission in the visible wavelengths is less than two percent and the reflectivity is therefore very high. The reflectivity characteristics of the surfaces are achieved by applying specific multilayer coatings to those surfaces.

It should be noted that there is now extensive literature on the preparation of wavelength specific coatings. (For example, see the patents cited above.) The subject invention is not intended to be limited to any particular coating formula. Moreover, the coatings selected can be for a specific wavelength or wavelength range. The only restriction is that the coatings address different wavelengths or wavelength regions.

In the implemented embodiment, the inner surface of the mirror is planar and the outer surface (viewed from the planar side of the optic) is convex with an 8 meter radius. The wedge angle between the front and back surfaces was specified to be less than 1 minute of arc. This wedge angle is within reasonable manufacturing tolerances and is significantly less restrictive than the one second of arc tolerance required if both surfaces were curved.

The spacing between mirror 22 and the output coupler is 59.5 cm. The coating on the inner surface 50 of the output coupler 24 has a reflectivity of 99.6 percent for the UV lines and 80 percent for the visible line at 488 nm. The inner surface is concave with a 3 meter radius. The outer surface is designed to be fully transmissive at both wavelength regions and includes a standard antireflection coating. Since it is preferable to coat the outer surface of the output coupler with an antireflection layer, the subject invention is best implemented on the high reflector mirror of the laser cavity.

As described in the above cited '379 patent, the gas discharge of the laser is confined by a plurality of aligned tungsten discs. In the implemented embodiment, the aperture in one of these discs also served as the mode control aperture 12. The diameter of the aperture was 0.070 inches. The laser operated with the above described structure generated a $TEM_{00}$ output of 200 milliwatts at 488 nm and 50 milliwatts of combined UV power at the 351 and 364 nm lines.

Figure 5:
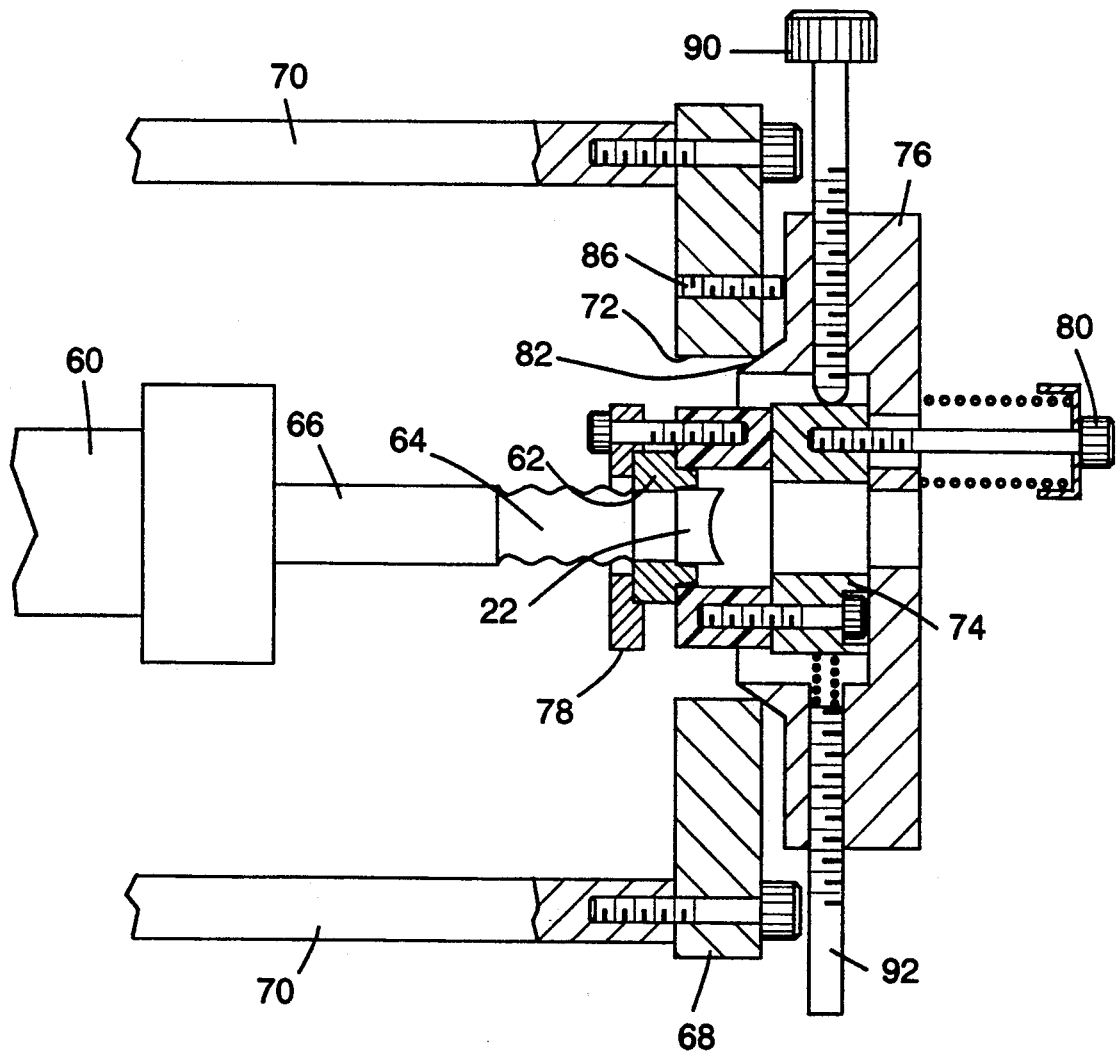
FIG. 5 is a cross sectional view of one type of mirror mount which can be used to adjust the angle and position of a resonator mirror.
Figure 6:
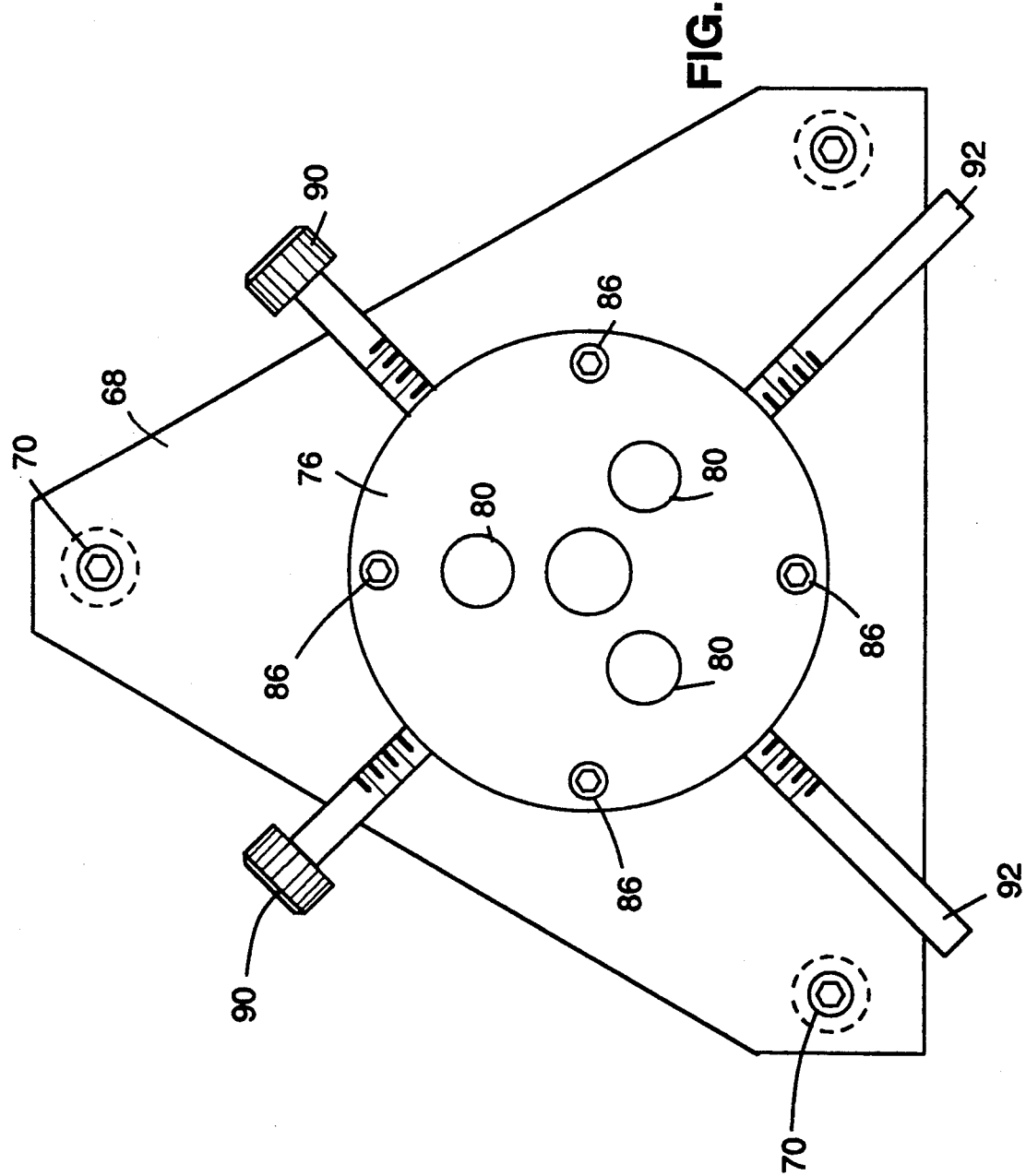
FIG. 6 is an end view of the mirror mount shown in FIG. 5.

FIGS. 5 and 6 illustrate one type of mirror mount which can be used to implement the subject invention. This mirror mount was assembled on the end of the laser tube 60 described above. This mount provides a sealed mirror configuration. As will be seen, the sealed mirror arrangement also allows the angle and position of the mirror 22 to be adjusted.

The mirror 22 is mounted to a seat 62 which is, in turn, mounted to a flexible bellows 64. The flexible bellows are connected to the stem 66 of the tube 60. The remainder of the mounting hardware provides resonator length stability and allows the bellows to be moved, adjusting the position of the mirror 22.

The adjustment hardware is mounted to an end plate 68 which is supported by three Invar rods 70. The Invar rods have a low coefficient of thermal expansion and help maintain the length and angular alignment of the resonator. The end plate includes a central opening 72 for receiving a translator plate 74, tilt plate 76 and a phenolic insulator 77. The translator plate 74 is connected to the phenolic insulator 77 by screws. The phenolic insulator is, in turn, connected to a mirror flange 78 by screws. The tilt plate 76 is connected to the translator plate 74 by three spring loaded center screws 80. The tilt plate includes a conical rim 82 which is slidably received within the opening 72 of the end plate.

Four orthogonal tilt screws 86 pass through the rear of the tilt plate 76 and into the end plate 68. By rotating the tilt screws 86 the angle of the tilt plate 76 is varied. The movement is accommodated by the conical rim sliding against the inner surface of the opening 72 in the end plate 68. The variation in the angle of the tilt plate is communicated to the mirror through the connections between the translator plate 74, phenolic insulator 77, mirror seat 62, mirror flange 78 and bellows 64.

The mirror 22 is translated in the plane parallel to the planar surface of the mirror by a pair of orthogonally mounted translation screws 90. The translation screws pass through the tilt plate 76 and abut the translation plate. One spring loaded biasing rod 92 is mounted directly opposite each translator screw 90. In this manner, full translational movement in the selected plane can be achieved by rotating the two translation screws.

In accordance with the subject invention, optimal alignment of the mirror is achieved by rotating the tilt screws 86 until the planar surface of the mirror 22 is perpendicular to the optical axis of the laser. The translator screws 90 are then adjusted until a line tangent to the curved surface of the mirror 22, at a point coincident with the laser beam, is perpendicular to the optical axis of the laser.

Once optimal alignment has been achieved, the three spring loaded center screws 80 are removed and locking screws are inserted in their place. In addition, the translator screws 90 and the biasing rods 92 can also be removed.

As noted above, a resonator mirror with wavelength specific coatings on two surfaces can be used for purposes other than for optimal mode control. The two surfaces can provide a degree of freedom for the coating designer allowing operation over a broader wavelength range. In addition, the coating designs could be implemented with fewer layers per surface thereby reducing losses. Furthermore, coatings can be specifically designed to enhance performance for low gain laser transitions such as in the UV region.

In summary there has been provided an improved laser mirror with wavelength selective coatings on the inner and outer surfaces thereof. The coating on the inner surface is reflective of light in a first wavelength region and transmissive of light in a second wavelength region. The outer surface is reflective of light in the second wavelength region. In the preferred embodiment, one of the surfaces of the mirror is planar and the other is curved to facilitate alignment. The different curvatures of the inner and outer surfaces allows the diameter of the beam of the two wavelength regions to be independently controlled allowing optimization of the mode generated by the laser.

While the subject invention has been described with reference to a preferred embodiment, various change and modifications could be made therein, by one skilled in the art, without varying from the scope and spirit of the subject invention as defined by the appended claims.

I claim:

1. A resonator mirror for use with a laser generating a beam of coherent light comprising:
   a transmissive substrate having front and rear surfaces each of said surfaces having a coating disposed thereon with the coating on said front surface being optimized to reflect light in a specified wavelength range and simultaneously transmissive at another wavelength range, and wherein the coating on said rear surface is reflective of at least said other wavelength range with the front surface having a curvature different from the curvature of the rear surface such that said surfaces permit each of said wavelength ranges to be focused independently.

2. A mirror as recited in claim 1 wherein one of said surfaces of said substrate is planar and the other of said surfaces is curved.

3. A laser comprising:
   a resonant cavity including at least one mirror, said mirror being defined by a transmissive substrate having inner and outer surfaces, each of said surfaces having a coating disposed thereon with the coating on said inner surface being optimized to reflect light in a specified wavelength range and simultaneously transmissive at another wavelength range, and wherein the coating on said outer is reflective of at least said other wavelength range with the front surface having a curvature different from the curvature of the rear surface such that said surfaces permit each of said wavelength ranges to be focused independently.
   a gain medium capable of lasing at wavelengths in both said wavelength ranges; and
   means for exciting said gain medium so that said laser emits laser light in both of said wavelength ranges simultaneously.

4. A laser as recited in claim 3 wherein one of said surfaces is planar and the other is curved.

5. A laser comprising:
   a resonant cavity including at least one mirror, said mirror being defined by a transmissive substrate having inner and outer, surfaces, each of said surfaces having a coating disposed thereon with the coating on said inner surface being optimized to reflect light in a specified wavelength range and simultaneously transmissive at another wavelength range, and wherein the coating on said outer surface is reflective of at least said other wavelength range with the front surface having a curvature different from the curvature of the rear surface such that said surfaces permit each of said wavelength ranges to be focused independently.
   a gain medium having at least two losing transition corresponds to wavelengths in both said wavelength ranges;
   means for exciting said gain medium so that said laser emits laser light in both of said wavelength ranges;
   a mode control aperture means located within said resonant cavity; and
   means for adjusting the position of said one mirror to optimize the mode characteristics of both wavelength ranges.

6. A laser as recited in claim 5 wherein one of said surfaces is planar and the other is curved.

7. A laser as recited in claim 6 wherein said one mirror has a lateral and angular position and wherein said position adjusting means allows both the lateral and angular position of said one mirror to be adjusted.

8. A laser comprising:
- a resonant cavity defined by opposed first and second mirrors, with said first mirror being, partially transmissive and defining an output coupler;
- a gain medium located within the resonant cavity, said gain medium having more than one lasing transition;
- means for exciting said gain medium to emit radiation in two different wavelength regions simultaneously; and
- an aperture means located within said resonant cavity for controlling the mode of the radiation and wherein said second mirror has an inner and an outer surface with the inner surface being reflective for one of said wavelength regions and transmissive of the other region and being oriented to align said first, wavelength region through said aperture means in a manner to optimize its mode characteristics and with said outer surface being reflective of said second wavelength region and being oriented to align said second wavelength region through said aperture means in a manner to optimize its mode characteristics.

9. A laser as recited in claim 8 wherein the curvature of said inner and outer surfaces of said second mirror are different.

10. A laser as recited in claim 9 wherein one of said surfaces is planar and one of said surfaces is curved.

11. A laser as recited in claim 10 further including means for adjusting the angle and position of the second mirror to optimally align the radiation through said aperture means.

12. A laser as recited in claim 11 wherein the inner surface is planar and the outer surface is convex.

13. A laser as recited is claim 12 wherein said gain medium is argon gas and wherein said first wavelength region is in the ultraviolet range and includes the 351 and 364 nm wavelengths and wherein said second wavelength region is in the visible range and includes the 488 nm wavelength.

14. A method of optimizing the mode performance of a laser generating radiation in two wavelength regions, said laser including a resonator having a mirror with inner and outer surfaces, with the inner , surface reflecting one of said wavelength regions and transmitting the other wavelength region, and with the outer surface reflecting said other wavelength region, with one of said surfaces being planar and the other surface being curved, said laser further including a mode control aperture, said method comprising:
- adjusting the angle of the mirror to optimally align the light reflected off the planar surface with mode control aperture; and
- translating the mirror in a plane parallel to the planar surface of the mirror to optimally align the light reflected off the curved surface with the mode control aperture.

15. A method as recited in claim 14 wherein the angle of the mirror is adjusted so that the planar surface is perpendicular to the optical axis of the laser.

16. A method as recited in claim 15 wherein the mirror is translated such that a line tangent to said curved surface at a point coincident with the reflected light is perpendicular to the optical axis of the laser.

* * * * *

UNITED STATES PATENT AND TRADEMARK OFFICE
CERTIFICATE OF CORRECTION

PATENT NO. : 5,101,415
DATED      : March 31, 1992
INVENTOR(S): William P. Kolb and Benjamin H. Cook, Jr.

Page 1 of 2

It is certified that error appears in the above - identified patent and that said Letters Patent is hereby corrected as shown below:

Column 1, line 64, change "wavelengths" to --wavelength--;

Column 2, line 28, change "laser at" to --lase at--;

Column 2, line 32, change "not laser" to --not lase--;

Column 3, line 43, change "used optimize" to --used to optimize--;

Column 3, line 64, change "and laser" to --and lase--;

Column 6, line 6, change "352" to --351--;

Column 6, line 8, change "90" to --95--;

Column 7, line 68, change "various change" to --various changes--; and

Column 8, lines 57-58, change "losing transition corresponds" to --lasing transitions corresponding--.

The sheet of drawing consisting of Fig.5 should be deleted and replaced with the attached Figure 5.

Signed and Sealed this

Fifth Day of October, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,101,415

DATED : March 31, 1992

Page 2 of 2

INVENTOR(S): William P. Kolb and Benjamin H. Cook, Jr.

It is certified that error appears in the above-identified patent and that said Letters Patent is hereby corrected as shown below:

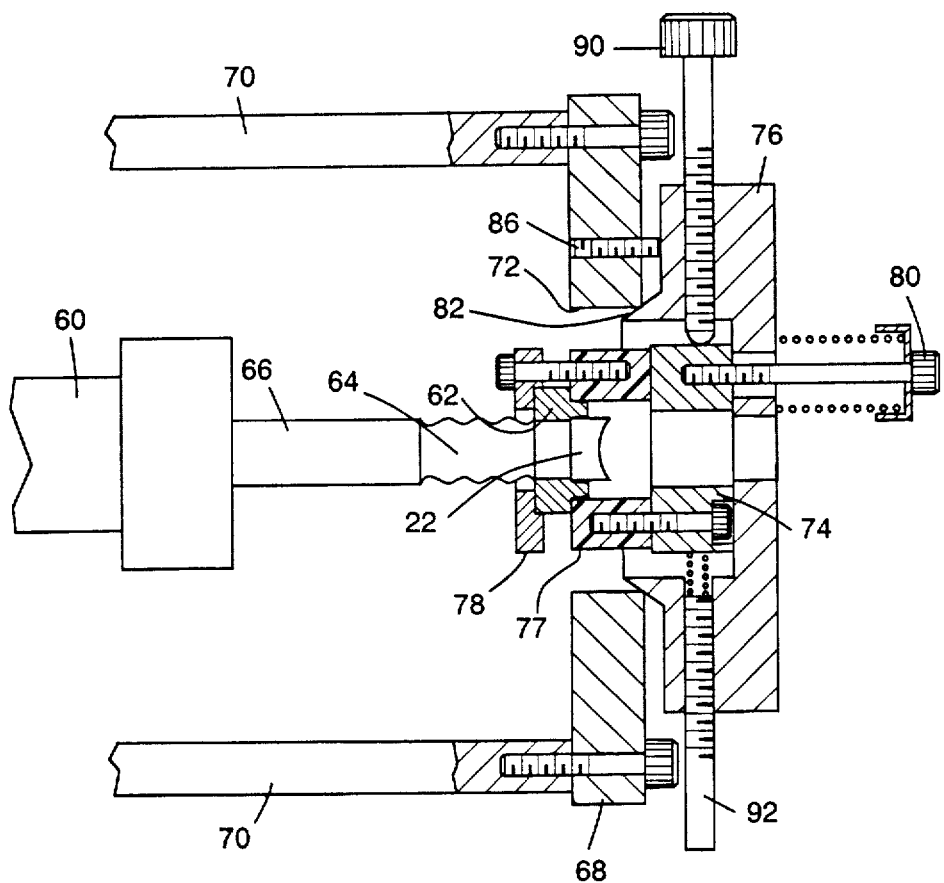

FIG. 5